United States Patent
Horst et al.

(10) Patent No.: US 8,736,422 B2
(45) Date of Patent: May 27, 2014

(54) METHOD AND READER TO CONDUCT A LABEL QUERY IN A RADIO FREQUENCY IDENTIFICATION SYSTEM

(75) Inventors: Dieter Horst, Cadolzburg (DE); Dan Yu, Beijing (CN); Yong Yuan, Beijing (CN); Liang Zhang, Beijing (CN)

(73) Assignee: Siemens Aktiengesellschaft, Munich (DE)

( * ) Notice: Subject to any disclaimer, the term of this patent is extended or adjusted under 35 U.S.C. 154(b) by 641 days.

(21) Appl. No.: 12/675,825

(22) PCT Filed: Jul. 22, 2008

(86) PCT No.: PCT/EP2008/059582
§ 371 (c)(1),
(2), (4) Date: Mar. 1, 2010

(87) PCT Pub. No.: WO2009/027154
PCT Pub. Date: Mar. 5, 2009

(65) Prior Publication Data
US 2010/0207731 A1      Aug. 19, 2010

(30) Foreign Application Priority Data
Aug. 31, 2007   (CN) .......................... 2007 1 0148372

(51) Int. Cl.
*H04Q 5/22*        (2006.01)
(52) U.S. Cl.
USPC ........................................ 340/10.1; 340/10.3

(58) Field of Classification Search
USPC ................ 340/10.1, 10.3, 10.31, 10.32, 10.4, 340/10.41, 10.42
See application file for complete search history.

(56) References Cited

U.S. PATENT DOCUMENTS

| | | |
|---|---|---|
| 2004/0150510 A1 | 8/2004 | Taki et al. |
| 2005/0099270 A1* | 5/2005 | Diorio et al. ............... 340/10.51 |
| 2007/0109129 A1 | 5/2007 | Sundstrom et al. |

OTHER PUBLICATIONS

"Specification for RFID Air Interface. EPC™ Radio-Frequency Identity Protocols Class-1 Generation-2 UHF RFID Protocol for Communications at 860 MHz-960 MHz" Version 1.0.9 (Jan. 2005).

\* cited by examiner

*Primary Examiner* — Jennifer Mehmood
*Assistant Examiner* — Yong Hang Jiang
(74) *Attorney, Agent, or Firm* — Cozen O'Connor

(57) ABSTRACT

A method for conducting a passive label query in a radio frequency identification system, wherein a query process conducted by a reader for a group of passive labels comprises a first query and a subsequent query. The link frequency used by a reverse link from the passive label to the reader in the subsequent query is smaller than that the link frequency used by the reverse link in the first query. The method improves the reverse link performance of a passive label radio frequency identification system, and increased the reading success rate of the passive label. A reader is also provided to implement the method.

15 Claims, 2 Drawing Sheets

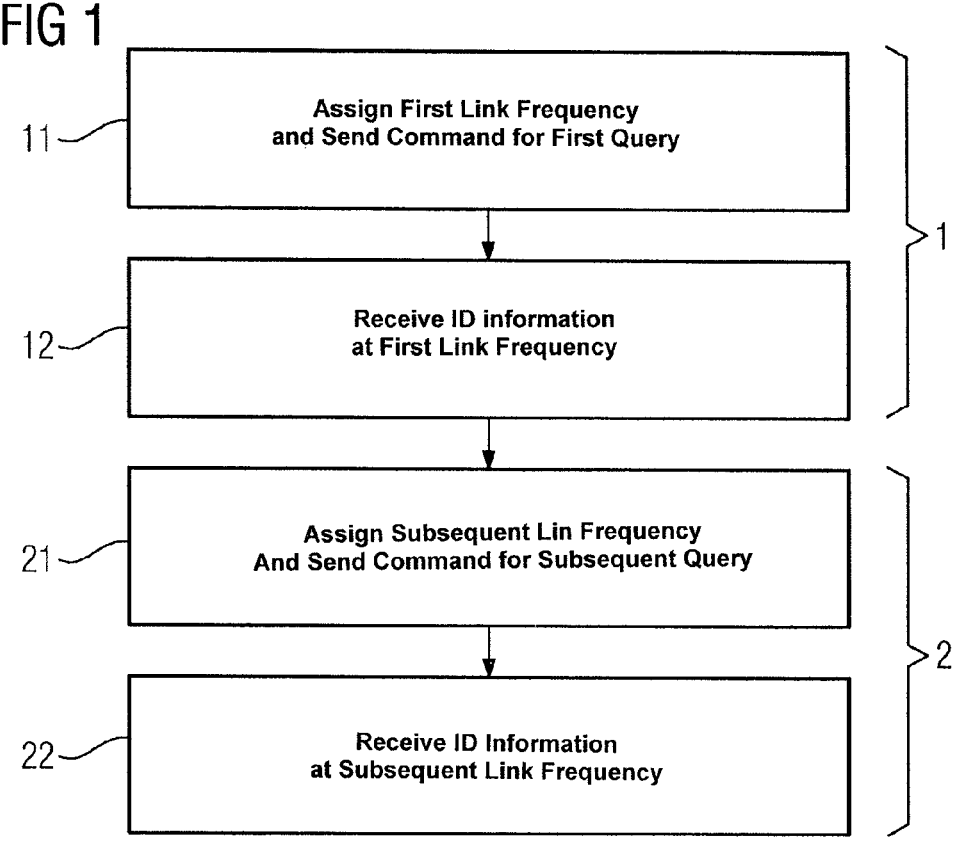
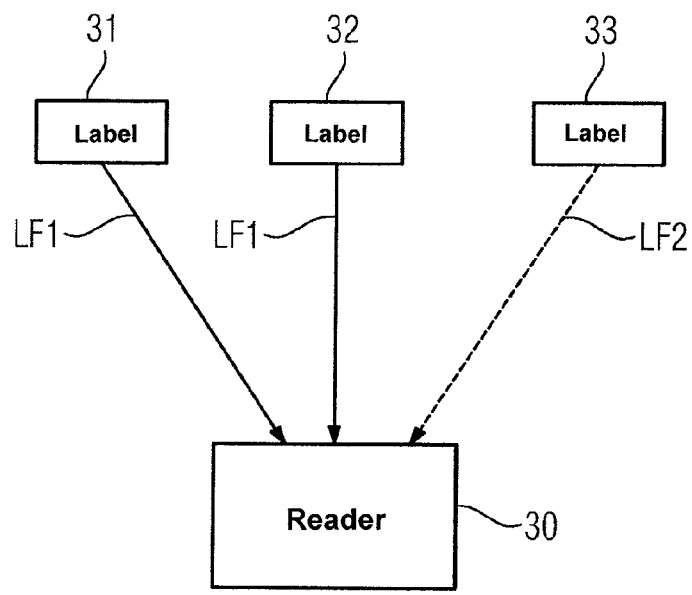

METHOD AND READER TO CONDUCT A LABEL QUERY IN A RADIO FREQUENCY IDENTIFICATION SYSTEM

CROSS-REFERENCE TO RELATED APPLICATIONS

This is a U.S. national stage of International Application No. PCT/EP2008/059582, filed on 22 Jul. 2008. Priority is claimed on Chinese Application No. 2007 10 148 372.9, filed on 31 Aug. 2007.

BACKGROUND OF THE INVENTION

1. Field of the Invention

The present invention relates to radio frequency identification (RFID) technology and, more particularly, to a method for conducting a label query in a RFID system and a reader to implement the method.

2. Background of the Invention

An RFID system basically comprises a reader and labels. Usually each label has a unique identification, and the labels can be attached to an object, such as a commodity, to identify the target object and can carry other relevant information. The reader sends a signal to the label or receives a signal from the label in an RF link by an antenna to read the identification and other relevant information of the target object from the label. There are two types of labels, i.e., read-only and read-write. For a read-write label, the reader can write relevant information to the label. Depending on the excitation method, labels can be classified into active RFID labels and passive RFID labels. An active label is powered by a battery to send signals to the reader actively. Without a battery, a passive label needs to obtain energy from the RF wave emitted by the reader for power supply. Therefore, the query process of the RFID system using passive labels is initiated by the reader.

Taking Electronic Product Code (EPC) global Class-1 Generation-2 standard EPC Radio-Frequency Identity Protocols Class-1 Generation-2 (C1G2) UHF RFID Protocol for Communications at 860 MHz-960 MHz Version 1.0.9 as an example, the basic operation process of the RFID system using passive labels is shown below. The reader loads information related to query at a certain radio frequency and sends it to the label. The label obtains energy from the radio frequency signal, and acquires information related to the query from the radio frequency signal received from the reader. Then, the reader sends a continuous-wave radio frequency signal to the label, and receives returned information from the label at the continuous-wave frequency, and the label returns information related to the label to the reader at the continuous-wave frequency through backscattering. The signal direction from label to reader is called a reverse link.

The RFID system transmits information through a radio signal. Consequently, the environment influences the performance of the radio link, thus influencing the operation performance of the system, such as reading rate and reading time. In an actual multipath environment, it is possible that not all passive labels can return information to the reader successfully due to poor performance of the reverse link of some passive labels. To solve this problem, in conventional systems several queries are usually conducted for labels which failed to return information in order to increase the reading rate of the system. However, in these queries, the reverse link uses a fixed link frequency (LF) to return information from the label to the reader, which cannot actively improve and influence the performance of the reverse link. Therefore, reliance is normally made simply on repeated readings to increase the reading rate.

In addition, in an environment with dense readers, the reverse link from passive label to reader may develop another problem. That is, as readers do not know the reverse link frequency selected by other readers, one reader may select a reverse link frequency that has already been used by another reader. At this point in time, the reverse link of some readers is blocked at this reverse link frequency, causing poor performance of the reverse link.

To solve the aforesaid problems, a method to conduct a label query in the RFID system and corresponding apparatus are needed to improve the successful reading rate on passive labels by improving the performance of the reverse link while balancing overall reading time.

SUMMARY OF THE INVENTION

It is therefore an object of the present invention to provide a method for conducting a label query in the RFID system and a reader for implementing the method so that labels that failed to return information to the reader in the first query due to inferior performance of the reverse link can return information to the reader in the subsequent query over the reverse link with improved performance, hence increasing the reading rate of the RFID system while balancing the overall reading time. Furthermore, reduced overall reading performance due to use of a single link frequency by multiple readers in an environment with dense readers is prevented.

This and other objects and advantages are achieved in accordance with the invention by a method for conducting a label query in the RFID system in which a reader conducts a first query for a group of passive labels, and the first query comprises:

In a first step of the first query, denominated step 11, the reader assigns the first link frequency to be used in the reverse link from label to reader, and commands each label to return identification information of the label at the first link frequency;

in a second step of the first query, denominated step 12, the reader receives identification information returned from the labels at the first link frequency and acknowledges the labels that have successfully returned the identification information;

where the reader executes at least one subsequent query for unacknowledged labels, and every subsequent query comprises:

In a first step of the subsequent query, denominated step 21, the reader assigns a subsequent link frequency smaller than the first link frequency for use in the reverse link from label to reader, and commands the labels that have failed to return identification information to return the identification information at the subsequent link frequency;

in a second step of the subsequent query, denominated step 22, the reader receives identification information returned from the labels at the subsequent link frequency, and acknowledges the labels that have successfully returned the identification information.

In alternative embodiments, more than one subsequent query is conducted.

In a preferred embodiment, the subsequent link frequency used by the reverse link in every subsequent query is smaller than the link frequency used in the previous query. That is, the assigned link frequency is reduced stepwise from one subsequent query to the next subsequent query.

In an alternative embodiment, the reverse link of every subsequent query uses the same subsequent link frequency.

That is, the first query is conducted at a comparably high frequency, while every subsequent query is conducted at the same comparably low subsequent frequency.

In a specific embodiment, in step 11, the reader sends a command to each label through query command QUERY, as defined by EPC global C1G2 standard, and parameters TRcal and DR (EPC global C1G2 standard) in the query command QUERY carry information about the first link frequency; in step 21, the reader sends a command to unacknowledged labels through query command QUERY ADJUST, as defined by EPC global C1G2 standard, and parameters TRcal and DR (EPC global C1G2 standard) in the query command QUERY ADJUST carry information on the subsequent link frequency.

In a further specific embodiment, the identification information comprises the temporary random number ID (RN16) of said label and electronic product code (EPC) of the label. Preferably, the reader receives the returned identification information in the following order: firstly, the reader receives the temporary random number ID RN16 of the label, and then sends an acknowledgement command to the labels that have successfully returned the temporary random number ID RN16; secondly, said reader receives the returned electronic product code EPC of said label.

In a preferred embodiment, after step 12 of the first query and before step 21 of the subsequent query, there is a third step 13 of the first query denominated step 13 where the reader accesses the labels that have successfully returned identification information at the first link frequency to obtain further information, and where the reader receives further information returned from the labels through the reverse link at the first link frequency. The so-called "access" can be several operations including read, write and access password control, etc.

In a further preferred embodiment, after step 22 of the subsequent query, there is provided third step of the subsequent query denominated step 13 where the reader accesses the labels that have successfully returned identification information at the subsequent link frequency to obtain further information, and where the reader receives further information returned from the label through the reverse link at the subsequent link frequency.

In accordance with the contemplated embodiments of the invention, a reader is also provided to conduct a label query in the RFID system in accordance with the above-mentioned method, where the reader comprises:

A transmitter unit, which is used to transmit commands to labels; a link frequency assignment unit, for use in the first query to assign the first link frequency to be used in the reverse link, and for use in the subsequent query to assign the subsequent link frequency smaller than first link frequency to be used in the reverse link; a query unit, for use in the first query to create a query command triggering the labels to return identification information at the first link frequency, and to send the query command through the transmitter unit, and for use in the subsequent query to create a query command triggering labels that failed to return identification information to return identification information at the subsequent link frequency, and to send the query command through the transmitter unit; a receiver unit, for use in the first query to receive information returned from the labels at the first link frequency, and for use in the subsequent query to receive information returned from labels at the subsequent link frequency; an identification information acquisition unit, which is used to acquire identification information returned by the labels from the information received from the receiver unit, and to acknowledge with the labels and send an acknowledgment command through the transmitter unit.

In a preferred embodiment, the link frequency assignment unit comprises a sequencing unit and a selection unit, where the sequencing unit is used to sequence candidate link frequencies from high to low for the selection unit to choose from while the selection unit is used to assign, based on the sequencing result of the sequencing unit, the highest candidate link frequency as the first link frequency for use by the first query, and to assign the subsequent link frequency smaller than the link frequency used in the previous query for use by the subsequent query.

Furthermore, the reader comprises a label access unit, which is used to access the labels that have successfully returned identification information to acquire further information, to send the access command through the transmitter unit, and acquire the further information from the information received from the receiver unit.

In the disclosed embodiments of the method and apparatus of the present invention, the reverse link of the label that failed to return information uses a reduced link frequency in the subsequent query so that the receiving sensitivity of the reader at the reverse link is increased. As will be appreciated by those skilled in the art, the link frequency (LF) decides the rate at which data are returned from the label, and the transmission time per bit is $T_b=1/LF$. Assuming that transmission power of data returned from the label is P13 and noise power is $N_o$, therefore, signal noise ratio $SNR=P_bT_b/N_o$. Obviously, with decreased link frequency LF, the transmission time per bit Tb and signal noise ratio SNR will increase and the receiving sensitivity will improve whereas the reading speed will decrease. In the subsequent query process, using a reduced link frequency can improve the receiving sensitivity of the reverse link, improving performance of the reverse link in the RFID system, so that the success rate of reading in every subsequent query can be improved. As the number of labels that failed to return identification information after the first query is significantly decreased compared to the number of labels involved in the first query, the influence of the reduced link frequency on the reading speed is not obvious at each time of reading in the subsequent query. As a result, the overall reading rate is increased while the overall reading time is improved.

In addition, different link frequencies are used for the reverse links in the subsequent query. As a result, the long-time congestion of several readers at a fixed reverse link frequency can be avoided, hence improving the performance of the reverse link.

Concluding, the disclosed embodiments of the present invention provide a method to conduct a label query in a radio frequency identification system (41), where a query process conducted by a reader (30) for a group of a passive labels (40) comprises a first query (1) and a subsequent query (2). The link frequency (LF2) used by a reverse link from label (40) to reader (30) in the subsequent query (2) is a smaller than that (LF1) used by the reverse link in the first query (1). With the disclosed comtemplated embodiments of the method of the present invention, the reverse link performance of a passive label radio frequency identification system is improved, and the success rate of reading is increased. The disclosed embodiments of the invention further provides a reader (30) to implement the comtemplated embodiments of the method of the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 1 is a flow chart illustrating a query method in accordance with a first embodiment of the present invention;

FIG. 2 is a schematic block diagram of a reader in accordance with an embodiment of the present invention;

FIG. 1 shows a flow chart of a label query in accordance with an embodiment of the present invention. In accordance with the present embodiment, the basic idea of the present invention is that, when a reader (FIG. 2) conducts a query for a group of passive labels (FIG. 2), its query process comprises a first query 1 and at least one subsequent query 2, where the link frequency used by the reverse link from label to the reader in the subsequent query 2 is smaller than the link frequency used by the reverse link in the first query 1. As a preferred solution, in case at least two subsequent queries 2 are conducted, gradually reduced link frequencies are used for the reverse link in every subsequent query 2. In accordance with the contemplated embodiment of the present invention as shown in FIG. 1, a reader conducts, for example, an inventory query, for a group of selected labels. The group of labels can be selected using a known method. A basic query process is shown below.

Figure 3:
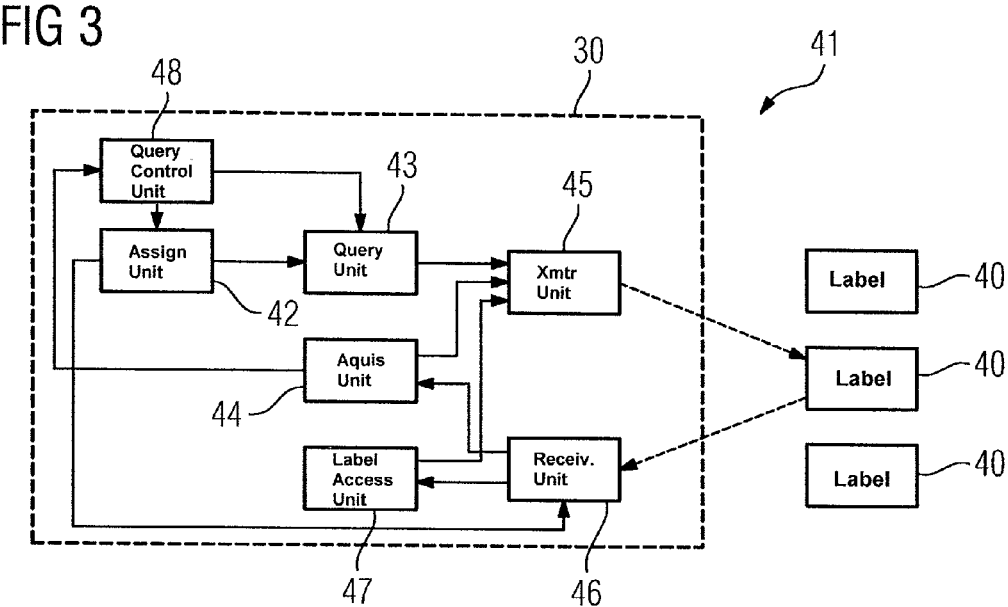
FIG. 3 is a schematic diagram showing the structure of the reader of the present invention.

Firstly, the first query 1 is conducted, comprising essentially two steps, namely i.e. a first step 11 and a second step 12. In step 11, the reader firstly assigns a first link frequency LF1 for the reverse link from label to reader, and then sends a query command to the group of labels, demanding each label to return its respective identification information at the first link frequency; wherein, said query command carries information on the first link frequency LF1, and said information can be either the first link frequency LF1, or other parameters can be used to derive the first link frequency LF1. Said query command can further carry other parameters for communication between the reader and selected group of labels. For examples of specific parameters, refer to EPC global C1G2 standard.

After receiving the query command from the reader, the label returns its identification information to the reader over the reverse link at the first link frequency LF1, which can be achieved through backscattering at the first link frequency LF1. The identification information comprises the electronic product code of label Furthermore, returned identification information can comprise other relevant information for assisting label identification transmission, for example, temporary random number identification for avoiding conflict, information for indicating length or information for verification.

In step 12, after receiving the identification information returned from the label at the first link frequency LF1, the reader acknowledges the labels that have successfully returned identification information. Next, the labels, which have successfully returned the identification information, and labels, which have failed to return the identification information, can be distinguished by changing a mark indicating whether the query is successful in the label or by changing the work status of the label.

Optionally, the reader can choose to access the labels that have successfully returned the identification information at the first link frequency to acquire more information stored in the label, where the reader receives information returned from the label through the reverse link at the first link frequency. The so-called "access" can be several operations including read, write and access password control.

Next, the subsequent query 2—comprising essentially two steps, namely a first step 21 and a second step 22—is performed. In the subsequent query 2 of the contemplated embodiment of the present invention, the reader assigns the subsequent link frequency LF2 smaller than the first link frequency LF1 to be used in the reverse link from label to reader, and the label returns the identification information to the reader at the assigned subsequent link frequency LF2.

The specific procedure is shown below.

In step 21, the reader assigns a subsequent link frequency LF2 smaller than the first link frequency LF1 to be used in the reverse link from label to reader, and uses a subsequent query command to demand the labels that have failed to return identification information to return identification information at the subsequent link frequency LF2; where the query command carries information on the subsequent link frequency LF2, and the information can either be the subsequent link frequency LF2, or other parameters that can be used to derive the subsequent link frequency LF2. The subsequent query command can also carry other parameters for communication between the reader and the selected group of labels, and these parameters can be either the same as those in the first query command, or other changed parameters. For specific examples, refer to the EPC global C1G2 standard. It should be noted that the labels failing to return the identification information can be distinguished by the method as described in step 12.

After receiving the query command from the reader, the label that failed to return the identification information returns its identification information to the reader over the reverse link at the subsequent link frequency LF2, which can be achieved by backscattering at the subsequent link frequency LF2. The identification information can be the electronic product code (EPC) of the label. In addition, the returned identification information can comprise other relevant information for assisting label identification transmission, for example, temporary random number identification for avoiding conflict, information for indicating length or information for verification.

In step 22, the reader receives the identification information returned from the label at the subsequent link frequency LF2, and sends an acknowledgement command to the labels that have successfully returned identification information. Next, the labels that have successfully returned the identification information and labels that have failed to return identification information can be distinguished by changing its mark indicating whether the query is successful in the label or by changing the work status of the label.

The reader can then optionally choose to access the labels that have successfully returned the identification information at the subsequent link frequency to acquire more information stored in the labels, where the reader receives information returned from the labels through the reverse link at the subsequent link frequency, whereby the reader can also receive the information returned from the labels through the reverse link with improved performance in the access process. If there are still labels that have failed to return the identification information after two queries 1, 2, the reader may conduct several subsequent queries for these remaining labels. Whether there are still labels that have failed to return the identification information can be predicted by whether the expected amount of information returned from labels is received in the subsequent query 2 to determine whether it is necessary to conduct more subsequent queries 2. The number of subsequent queries 2 can be predefined according to the previous experience with system operation or system simulation results to achieve a balance between overall success rate of reading and overall reading time.

The subsequent link frequency herein refers to the link frequency selected from frequencies smaller than the first link frequency. The subsequent link frequency used in every subsequent query can be the same frequency, or different frequencies. However, in a preferred embodiment the subsequent link frequency used by the reverse link in every subsequent query is gradually decreased, so that the reverse link with increasingly improved performance can be used to increase the success rate of reading. For example, link frequencies LF1>LF2>LF3 are set as candidate frequencies. In the first query, the reverse link uses the highest frequency, LF1, as the first link frequency and in the second query, the highest frequency in unused candidate frequencies is selected, i.e., LF2, as the subsequent link frequency of the second query for the reverse link. In the third query, there is only one unused candidate frequency, i.e., LF3, therefore LF3 is used as the subsequent link frequency of the third query for the reverse link. The overall reading rate can be increased by several subsequent queries.

FIG. 2 shows an embodiment of the reader in accordance with the present invention, where the RFID system is based on the EPC global C1G2 standard. In a specific case, a reader 30 wants to conduct a query for a Label 31, Label 32 and Label 33, where Label 31 and Label 32 have superior reverse link performance due to being a short distance from the reader, whereas Label 33 has an inferior reverse link performance because it is further away from the reader. In the first query 1, a relatively higher link frequency, LF1, is used for the reverse link, so that the reader 30 can conduct a query for three labels at a faster reading speed. Label 31 and Label 32 return label-specific information to the reader 30 through the reverse link at link frequency LF1 by backscattering, and due to inferior performance of its reverse link at relatively higher link frequency LF1, Label 33 fails to return the label-specific information to the reader 30. The reader then 30 only conducts a second query 2 for Label 33, with a link frequency LF2, which is lower than LF1, for the reverse link. Due to decreased link frequency, the performance of the reverse link from Label 33 to the reader 30 is improved. As a result, Label 33 can successfully return its relevant information to the reader. Lower link frequency LF2 used by the reader for the reverse link decreases reading speed of this query, however, as there is only one reading object, Label 33, in this query, overall reading speed will not be decreased considerably.

Here, the second embodiment is used as an example to describe the specific queries process of the reader for a label.

Firstly, the reader 30 selects the label group to be queried or accessed through SELECT command according to the method specified in the EPC global C1G2 standard, and sets the parameter TARGET as S1 and parameter ACTION as B→A (commanding to switch a query mark from B to A). Through selection command, Label 31, Label 32 and Label 33 know the reader will query them, and set their parameters to S1 and A according to the command.

The reader 30 should also assign a link frequency LF1 for the reverse link. Then, the reader 30 sends a QUERY command to the labels; wherein, where the command specifies that labels with parameter values S1 and A should participate in the query process, e.g., Label 31, Label 32 and Label 33.

The query command also informs the label of the relevant information of the link frequency LF1 for the reverse link, for example, using parameter TRcal and DR to carry information about the link frequency. The query command can also carry other parameters, for example, time slot counting parameter Q for avoiding conflict of reverse links.

After receiving the query command, Label 31 and Label 32 return respective temporary random number identification RN 16 to the reader through the reverse link at the link frequency LF1 by backscattering. Due to inferior performance of its reverse link at the link frequency LF1, Label 33 fails to return an RN16 to the reader 30

After receiving the RN16 returned from Label 31 and Label 32, the reader 30 sends an ACK command separately to Label 31 and Label 32 and the command carries an RN16 returned from Label 31 and Label 32.

After receiving the acknowledgement command from the reader 30, Label 31 and Label 32 return their information, such as PC for indicating length, electronic product code EPC and CRC-16 for verification, to the reader 30 in the reverse link at the link frequency LF1. After receiving the acknowledgement command, Label 31 and Label 32 change their work status to ACKNOWLEDGED status.

After receiving the aforesaid label-specific information returned from Label 31 and Label 32, the reader can optionally choose to perform write and read operations on more information about Label 31 and Label 32 through the ACCESS command. As there is a detailed specification of the process in the EPC global standard, it will not be further described herein. In the access process, Label 31 and Label 32 return information to the reader 30 through the reverse link at the link frequency LF1 by backscattering.

Next, the reader 30 conducts a subsequent query 2. In accordance with the contemplated embodiment of the present invention, at this point in time, the reader 30 assigns a link frequency LF2 smaller than LF1 for the reverse link, and sends a subsequent query command. The EPC global C1G2 standard—based on Query, Query ReP or Query Adjust commands can be modified or extended to become the subsequent query command to report information related to the link frequency LF2 for the reverse link, preferably using the Query Adjust command where, the command also specifies that labels with parameters S1 and A should participate in the query process. The subsequent query command can also carry other parameters, and these parameters can be the same as those in the first query, or other accordingly modified parameters.

Upon receiving the subsequent query command, Label 31 and Label 32 with Acknowledged status will change their query marks from A to B, so that they will not participate in the subsequent query process. Label 33 is not in Acknowledged status, so its query mark remains A, and it should participate in the subsequent query process.

Now a relatively lower link frequency LF2 will be used so that the performance of the reverse link of Label 33 is improved to successfully return an RN16 to the reader 30.

Upon receiving an RN16 returned from Label 33, the reader 30 sends an acknowledgement command to Label 33, and the acknowledgement command carries an RN16 returned from Label 33.

Upon receiving the acknowledgement command from the reader 30, Label 33 returns its information, including PC, EPC and CRC-16 information to the reader 30 through the reverse link at the link frequency LF2 by backscattering. Upon receiving the acknowledgement command, Label 33 will change its work status to ACKNOWLEDGED status.

After receiving the aforesaid label-specific information returned from Label 33, the reader 30 can optionally choose to access more information in Label 33. In the access process, Label 33 returns information to the reader 30 through the reverse link at the link frequency LF2 by backscattering.

In addition, in cases where there are several readers, assuming two readers assign the same link frequency for the reverse link, it is very possible that several labels use the reverse link that is already in use. If the reader assigns a smaller link frequency for the reverse link in the subsequent query according to the present invention, it can avoid the busy link to prevent long-time congestion of several readers at a fixed reverse link frequency to achieve improved performance of the reverse link.

To implement the aforesaid method of the present invention, the present invention further provides a reader 30 for improving the performance of the reverse link from several labels 40 to the reader 30 of the RFID system 41. As shown in FIG. 3, the reader 30 comprises a link frequency assignment unit 42, a query unit 43, an identification information acquisition unit 44, a transmitter unit 45 and a receiver unit 46; in the presented embodiment the reader 30 comprises also a label access unit 47 and a query control unit 48, which are optional.

The transmitter unit 45 is used to send commands from the reader 30 to labels 40, where the commands can be a query command of the query unit 43, an acknowledgement command of the identification information acquisition unit 44 or an access command of the label access unit 47.

The link frequency assignment unit 42 is for use in the first query 1 to assign the first link frequency LF1 to be used in the reverse link from one of the labels 40 to the reader 30 and for use in the subsequent query 2 to assign a subsequent link frequency LF2 smaller than the first link frequency LF1 to be used in the reverse link from one of the labels 40 to the reader 30. In a preferred embodiment, the link frequency assignment unit comprises a sequencing unit and a selection unit, where the sequencing unit is used to sequence candidate link frequencies from high to low for the selection unit to choose from, and where the selection unit is used to assign, according to the sequencing result of the sequencing unit, the highest candidate link frequency as the first link frequency LF1 for use in the first query 1, and to assign a subsequent link frequency LF2 smaller than the link frequency used in the previous query for use in the subsequent query 2.

The query unit 43 is used in the first query 1 to conduct a query command, commanding the labels 40 to return identification information at the first link frequency LF1, and to send the query command through the transmitter unit 45; and in the subsequent query 2 to command those labels 40 that failed to previously return the identification information to return identification information at the subsequent link frequency LF2, and to send the query command through the transmitter unit 45.

The receiver unit 46 is used to receive information returned from the labels 40 through the reverse link at the link frequency assigned by the link frequency assignment unit 42, i.e., in the first query 1 to receive information returned from the labels 40 at the first link frequency LF1 and in the subsequent query 2, to receive information returned from the labels 40 at the subsequent link frequency LF2.

The identification information acquisition unit 44 is used to acquire identification information returned by labels 40 from the information received from the receiver unit 46 and acknowledge with the labels 40, and send the acknowledgement command through the transmitter unit 45.

In order for the reader 30 to have further access to the labels 40 to acquire information stored in the labels 40 other than the identification information, the reader 30 can further comprise the label access unit 47, which is used to access the label 40 that has successfully returned the identification information to acquire further information, send the access command through the transmitter unit 45, and acquire the further information from the information received from the receiver unit 46.

In addition, to support various subsequent queries 2, the reader 30 may further comprise the query control unit 48, which is used, in cases where the predefined number of attempts to execute the subsequent query 2 is not reached, or in cases where the reader receives identification information returned from the predefined number of labels 40, to instruct the link frequency assignment unit 42 to continue to assign a subsequent link frequency LF2 for the subsequent query 2 for use in the reverse link, and instruct the query unit 43 to repeat the subsequent query 2. In cases where there is no query control unit 48, the query unit is optionally configured to perform the first and one subsequent query in every query process.

For specific methods whereby the aforesaid units of the reader 30 coordinate with each other during operation, reference should be made to the descriptions in the prior disclosed embodiments of the method and reader.

Figure 4:
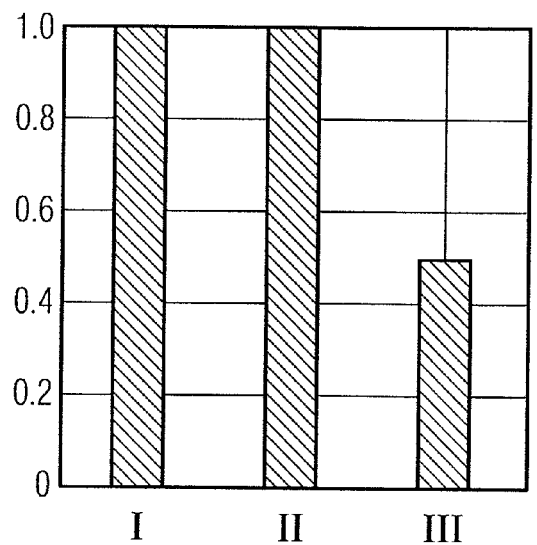
FIG. 4 shows the comparison of simulation results between the RFID system of the present invention and an RFID system of the prior art.

A performance comparison between the scheme of the present invention and the scheme of the prior art is conducted using an exemplary simulation. FIG. 4 shows the simulated success rate of reading various schemes in accordance with the contemplated embodiments of the present invention and in accordance with the prior art. In scheme I (in accordance with the contemplated embodiments of the present invention), an LF1 of 200 KHz is used as the link frequency for the reverse link in the first query, and an LF2 of 40 KHz as the link frequency for the reverse link in the subsequent query. Scheme II and scheme III are based on the prior art, i.e., a fixed link frequency is used for the reverse link, the link frequency of scheme II is LF=40 KHz, and the link frequency of scheme III is LF=200 KHz. It is to be assumed that there are 100 labels in the RFID system, where 50% of labels can successfully perform backscattering at the reverse link with a link frequency of 200 KHz, and the remaining 50% of labels can perform backscattering only at a link frequency of 40 KHz. As shown in FIG. 3, in case of failure of a reverse link, the success rate of reading in scheme I in accordance with the contemplated embodiments of the present invention can reach 1.0 after two queries, whereas the success rate of reading of scheme III in accordance with the prior art is around 0.5. Therefore, the scheme of the disclosed embodiments of the invention has a higher success rate of reading. The success rate of scheme II is equally 1.0 but due to the fixed lower link frequency the system of scheme II re-quires a longer reading time than scheme I of the disclosed embodiments of the present invention.

The above are only preferred embodiments of the present invention, and it should be pointed out that, for those of ordinary skill in the art, various improvements and modifications may be made without departing from the principle of the present invention, and such improvements and modifications should be regarded as within the protective coverage of the present invention.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for conducting a label query in a radio frequency system comprising a reader to execute a first query for a plurality of passive labels and at least one subsequent query for unacknowledged labels, the method comprising:
   assigning, by the reader during the first query, a first link frequency for use in a reverse link from each of said plural passive labels to the reader, and commanding each of said plural passive labels to return identification information of each of said plural passive labels at the first link frequency;
   receiving, at the reader during the first query, the identification information returned from said plural passive labels at the first link frequency, and acknowledging said plural passive labels which have successfully returned the identification information in response to the first query;
   assigning, by the reader during the at least one subsequent query for unacknowledged labels of each of said plural passive labels, a subsequent link frequency lower than the first link frequency for use in the reverse link, and commanding the unacknowledged labels of each of said plural passive labels to return the identification information at the subsequent link frequency; and
   receiving, by the reader during the at least one subsequent query for unacknowledged labels of said plural passive labels, the identification information returned from said plural passive labels at the subsequent link frequency, and acknowledging each of said plural passive labels that have successfully returned the identification information in response to the at least one subsequent query;
   wherein candidate link frequencies are assigned from high to low for selection, a highest candidate link frequency being assigned as the first link frequency for the first query based on a sequencing result, and the subsequent link frequency lower than the link frequency used in the previous query being assigned to be used in the subsequent query based on the sequencing result.

2. The method as claimed in claim 1, wherein a plurality of subsequent queries is executed.

3. The method as claimed in claim 1, wherein the subsequent link frequency used by the reverse link in the at least one subsequent query is lower than the link frequency used in a previous query.

4. The method as claimed in claim 2, wherein the subsequent link frequency used by the reverse link in the at least one subsequent query is lower than the link frequency used in a previous query.

5. The method as claimed in claim 1, wherein the reverse link of every subsequent query uses a same subsequent link frequency.

6. The method as claimed in claim 2, wherein the reverse link of every subsequent query uses a same subsequent link frequency.

7. The method as claimed in one claim 1, wherein, when assigning during the first query, the reader sends a command to each of said plural passive labels through a query command, and parameters TRcal and DR in the query command carry information about the first link frequency; and wherein when assigning during the at one subsequent query, the reader sends a command to unacknowledged labels of each of said plural passive labels through a query adjust command, parameters TRcal and DR in the query adjust command carrying information about the subsequent link frequency.

8. The method as claimed in claim 7, wherein the query command and the query adjust command comply with standard Electronic Product (EPC) global Class-1 Generation-2 (C1G2).

9. The method as claimed in claim 1, wherein the identification information comprises a temporary random number ID of each of said plural passive labels and an electronic product code (EPC) of each of said plural labels.

10. The method as claimed claim 9, wherein the temporary random number ID comprises RN16 and complies with standard Electronic Product (EPC) global Class-1 Generation-2 (C1G2).

11. The method as claimed in claim 9, wherein the reader receives the returned identification information in a predetermined order.

12. The method as claimed in claim 11, wherein the predetermined order comprises receiving the temporary random number ID of each of said plural passive labels and sending an acknowledgement command to each of said plural passive labels which have successfully returned the temporary random number ID; and then receiving the returned EPC of each of said plural passive labels.

13. The method as claimed in claim 1, further comprising:
   after receiving, at the reader during the first query, the returned identification information in which the reader accesses each of said plural passive labels which have successfully returned identification information at the first link frequency to obtain further information and prior to the at least on subsequent entry, accessing each of said plural passive labels which have successfully returned the identification information to obtain further information and receiving at the reader further information returned from each of said plural passive labels through the reverse link at the first link frequency; and
   after the receiving, by the reader during the at least one subsequent query for unacknowledged labels of each of said plural passive labels, accessing, by the reader, each of said plural passive labels which have successfully returned the identification information at the subsequent link frequency to obtain further information, the reader receiving the further information returned from each of said plural passive labels through the reverse link at the subsequent link frequency.

14. A reader comprising:
   a transmitter unit configured to send commands to a plurality of passive labels;
   a link frequency assignment unit configured to assign, during a first query, a first link frequency for use in a reverse link and for use in a subsequent query to assign a subsequent link frequency lower than the first link frequency for use in the reverse link;
   a query unit configured to create a query command, during the first query, which triggers each of said plural passive labels to return identification information at the first link frequency, and to send the query command through the transmitter unit, and for use during the subsequent query to command each of said plural passive labels that failed to return identification information at the subsequent link frequency, and to send the query command through the transmitter unit;
   a receiver unit configured to receive information from each of said plural passive labels in the first query at the first link frequency and in the subsequent query at the subsequent link frequency; and an identification information acquisition unit configured to acquire the identification information returned by each of said plural passive labels from the information received from the receiver unit, and to acknowledge each of said plural passive labels and send an acknowledgement command through the transmitter unit wherein said link frequency assignment unit comprises a sequencing unit configured to sequence candidate link frequencies from high to low for a selection unit to choose from; and a selection unit, which is used to assign, based on the sequencing result of the sequencing unit, a highest candidate link frequency as the first link frequency for the first query and to assign the subsequent link frequency lower than the link frequency used in a previous query to be used in the subsequent query.

15. The reader as claimed in claim 14, further comprising:

a label access unit configured to access labels that have successfully returned identification information to acquire further information, send the access command through the transmitter unit, and acquire the further information from the information received from the receiver unit.

* * * * *